United States Patent [19]

Kaplan

[11] Patent Number: 5,215,370
[45] Date of Patent: Jun. 1, 1993

[54] LINEAR LIGHT SOURCE

[75] Inventor: Martin C. Kaplan, Rochester, N.Y.

[73] Assignee: Eastman Kodak Company, Rochester, N.Y.

[21] Appl. No.: 797,661

[22] Filed: Nov. 25, 1991

[51] Int. Cl.$^5$ .................................................. F21V 7/00
[52] U.S. Cl. ........................................ 362/296; 362/290; 362/298; 362/301
[58] Field of Search ............... 362/217, 296, 298, 297, 362/301, 341, 342, 290, 346, 292; 250/228; 356/236; 358/474, 475, 491; 355/37, 67, 71

[56] References Cited

U.S. PATENT DOCUMENTS

| | | | |
|---|---|---|---|
| 3,316,804 | 5/1967 | Weisglass | 355/67 |
| 3,374,706 | 3/1968 | Weisglass | 355/71 |
| 3,561,867 | 2/1971 | Simmon | 355/67 |
| 3,630,609 | 12/1971 | Clapp | 355/37 |
| 3,920,336 | 11/1975 | Sackett | 250/228 |
| 4,205,337 | 5/1980 | Millward | 358/54 |
| 4,551,628 | 11/1985 | Grossman | 250/503.1 |
| 4,710,624 | 12/1987 | Alvarez et al. | 250/228 |
| 4,797,711 | 1/1989 | Sasada et al. | 355/32 |
| 4,868,383 | 9/1989 | Kurtz et al. | 250/228 |
| 4,900,923 | 2/1990 | Gerlinger | 250/228 |
| 4,933,778 | 6/1990 | Milch | 358/491 |
| 5,079,678 | 1/1992 | Parker | 362/296 |
| 5,103,385 | 4/1992 | Federico et al. | 362/298 |

OTHER PUBLICATIONS

U.S. Ser. No. 07/559,481 entitled "Film Scanner", Clyde L. Fetterman & Marcello D. Fiscella, filed Jul. 27, 1990.

Primary Examiner—Richard R. Cole
Attorney, Agent, or Firm—David M. Woods

[57] ABSTRACT

A linear light source for a film scanner is disclosed which includes an elongated light integrating cavity having diffusely reflective walls. Light is introduced into the cavity through an input port, and an output beam of diffuse illumination is produced through a slot which is generally parallel to the longitudinal axis of the integrating cavity. In order to provide a light source which can produce a beam of a desired angular distribution, plates are positioned adjacent the exit slot of the cavity to form channels through which the light exits.

14 Claims, 3 Drawing Sheets

LINEAR LIGHT SOURCE

FIELD OF THE INVENTION

The present invention relates to a linear light source, and more particularly, to such a light source for use in a film scanner.

DESCRIPTION OF THE PRIOR ART

A film scanner typically includes a linear CCD image sensor which provides a serial output of signals representing successive lines of an image. For color applications, the film scanner can include an assembly of three separate CCD image sensors, one for each of the primary colors. The film is driven at a uniform rate past a light beam provided by an illumination system, and an illuminated section of the film is imaged onto each CCD image sensor. The film motion provides the frame scan, and the linear cycling of the elements in the image sensor provides the line scan. A scanner of this type is disclosed in U.S. Pat. No. 4,205,337.

It is common for film scanners to have an illumination system which produces a line of light across the film. The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g. scratches, will appear in an image produced from the scanned information.

An improved type of illumination system is disclosed in U.S. Pat. No. 4,868,383, which is assigned to the assignee of the present invention. This patent discloses a linear light source for a film scanner which includes means for generating an intense beam of light and an elongated cylindrical integrating cavity having diffusely reflective walls. The intense beam is introduced into the cavity through an input port, and a uniform line of light is emitted through an output slit which extends parallel to the longitudinal axis of the cylindrical integrating cavity. Such a light source produces a line of diffuse light which has a uniform linear and angular distribution, and excellent results can be obtained over a wide range of operating conditions. There is a need, however, in certain types of scanners for a linear light source in which the angular distribution issuing from such a light source can be very closely controlled in order to control the intensity of the light on a receiving medium.

SUMMARY OF THE INVENTION

It is an object of the present invention to overcome the problems in the prior art discussed above and to provide an improved linear light source for a film scanner.

In accordance with one aspect of the present invention, there is provided a linear light source comprising: a source for producing a beam of radiation; and an elongated light integrating cavity defined by walls having diffusely-reflecting interior surfaces, the walls having an input port through which the beam is introduced into said cavity and an output slot generally parallel to a longitudinal axis of the cavity, the beam being introduced into the cavity such that the beam undergoes at least one diffuse reflection before exiting the output slot, and the beam exiting the output slot through a channel formed adjacent the slot.

In one embodiment of the present invention, the light source includes an elongated light integrating cavity having diffusely reflective walls. Light is introduced into the cavity through an input port, and a line of diffuse illumination exits the cavity through an output slot which is parallel to a longitudinal axis of the integrating cavity. A plurality of plates are disposed adjacent the output slot to form a plurality of channels through which the beam exits the cavity. The plates are generally parallel to the longitudinal axis of the cavity and extend the length of cavity.

A principal advantage of the disclosed linear light source is that it can produce a bright line of light in which the angular intensity profile can be closely controlled. As a result of being able to closely control the angular intensity profile, the light source has increased brightness over a desired angular range, stray light can be reduced so there is less flare, and an angular intensity profile can be produced which is particularly effective in suppressing the effects of film surface damage such as a scratch.

Other features and advantages will become apparent upon reference to the following description of the preferred embodiment when read in light of the attached drawings.

DESCRIPTION OF THE PREFERRED EMBODIMENTS

Figure 1:
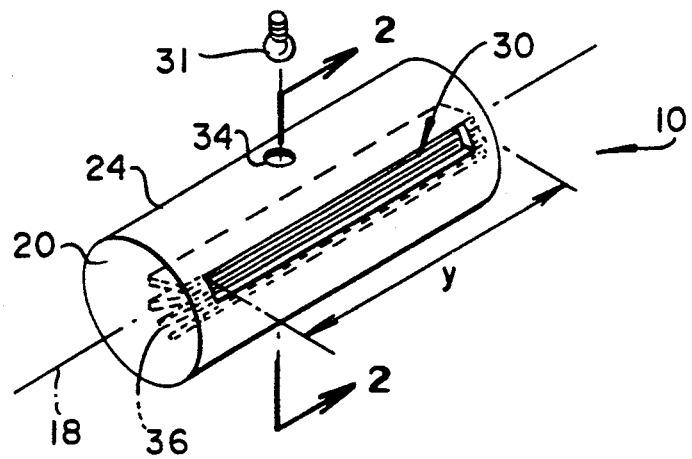
FIG. 1 is a perspective view of the linear light source of the present invention.

With reference to FIG. 1, there is shown a linear light source 10 constructed in accordance with the present invention. Light source 10 includes a body 14 having an elongated integrating cavity 12 therein. Body 14 is composed of a generally cylindrical wall portion 24 formed about a longitudinal axis 18 and end pieces 20 disposed at opposite ends of wall portion 24. The generally cylindrical wall portion 24 includes an exit slot 30. Light from a source 31 is provided to cavity 12 through an input port 34, and a line of light is emitted from cavity 12 through the exit slot 30. As will be explained in more detail hereinafter, the angular distribution of light emitted from slot 30 is controlled by plates 36 which are generally parallel to axis 18 and extend between end pieces 20. Light is emitted from slot 30 through channels 37 formed by the plates 36.

The body 14 of linear light source 10 is preferably made from aluminum, and the light-contacting surfaces are painted with Spectraflect ™ paint which is a highly reflective diffuse white paint; this paint is obtainable from Labsphere Corporation, North Sutton, N.H. Body 14 can also be machined from a block of diffusely reflecting polytetrafluoroethylene plastic, known as Spectralon, also available from the Labsphere Corporation. In one exemplary device, the cavity 12 is 27 millimeters long and the cylindrical wall portion 24 is 35.54 millimeters in diameter. The input port 34 is a round hole 12.5 millimeters in diameter, and the exit slot 30 is 2½ millimeters wide by 27 millimeters long. The plates 36 are approximately 0.5 mm thick and 2 mm wide. Plates 36 can also have a tapered cross section (not shown) in which the plate is about 0.5 mm thick adjacent slot 30 and about 1.0 mm thick at an opposite side. An important relationship in the present invention is the aspect ratio of the channels 37 formed by plates 36 which is the ratio of the average thickness x (shown in FIG. 2) of the channel 37 to the width z of the channel. For most applications, the aspect ratio of channels 37 should be greater than 1:3, and a preferred aspect ratio is 1:4. The length y of the channel is equal to the length of the exit slot 30.

Light source 10 is adapted to function with lamp 31 as the source of radiation, and lamp 31 can be, for example, a xenon lamp. One suitable xenon lamp is a Model No. LX-300f, manufactured by ILC Cermax Lamps. Other lamps can be used, e.g., a 24 volt DC tungsten-halogen lamp, type ELC, manufactured by General Electric Corporation. Light from lamp 31 can be directed into input port 34 of cavity 12 by various means such as a mirror, a lens, a fiber optic bundle, or a light pipe. The use of a light pipe or fiber optic bundle allows the radiation source and any focusing optics to be displaced from the cavity 12. These elements also provide mixing of input light. A suitable light pipe for introducing light into cavity 12 is a rod which is formed from fused quartz or a fused silica material and has a very high transmission, for example, a fused quartz rod obtainable from Heraeus-Amersil, Inc.

Temporal control of the illumination intensity of the radiation source (not shown) can be achieved by sampling the diffuse light from the integrating cavity 12. Such a system is disclosed in the aforementioned U.S. Pat. No. 4,868,383, and the disclosure of this patent is expressly incorporated herein by reference. As disclosed in this patent, a feedback port can be provided in the integrating cavity 12 to remove a sample of the diffuse light. The light exiting the feedback port is directed by means of an optical fiber to a photosensor such as a silicon photodiode. The output from the photodiode is provided through a feedback circuit to a power supply for the radiation source.

Figure 2:
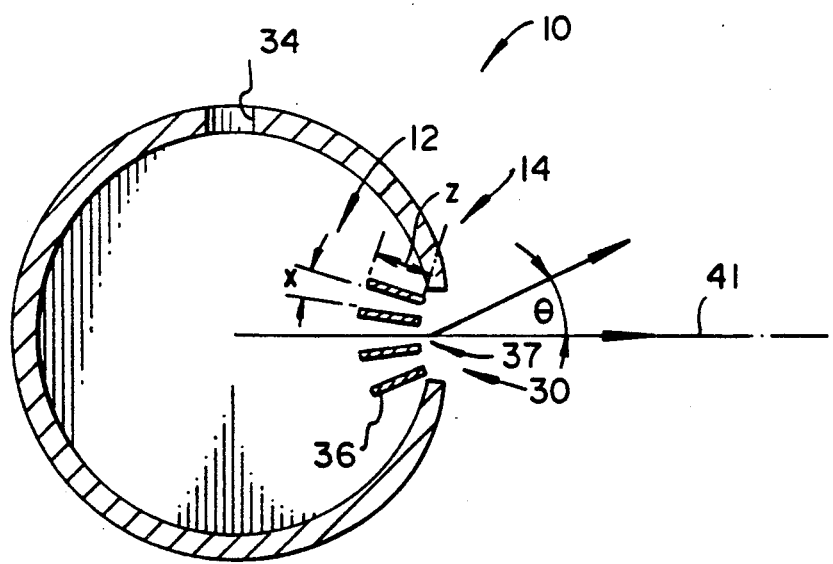
FIG. 2 is a sectional view taken along the line 2—2 in FIG. 1.
Figure 4:
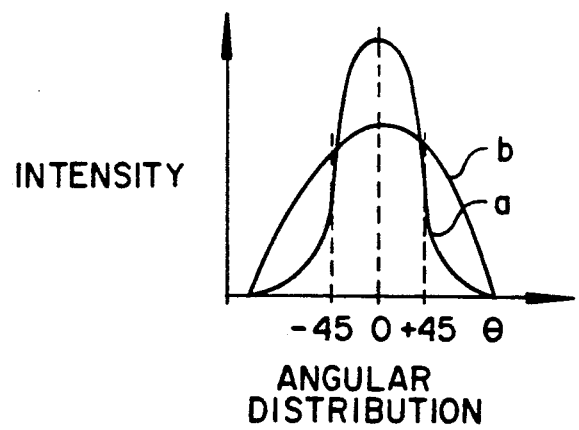
FIG. 4 is a graph illustrating the angular intensity profiles of different light sources.

An important feature of the linear light source 10 is the use of plates 36 to control the angular distribution of light exiting slot 30. With reference to FIG. 4, there is shown a first curve a of the angular intensity profile of light from linear light source 10 and a second curve b which shows the angular intensity profile of light from a similar linear light source which does not have plates 36. The angular intensity profile is determined by measuring the light within an angle of $\pm\theta$ relative to optical axis 41 (FIG. 2). Diffuse illumination of a film at angles extending out to approximately $\pm 45°$ will provide good scratch suppression. As shown in FIG. 4, light source 10 provides an intense beam of light between $\pm 45°$, the beam falling off rapidly to zero beyond these limits. The angular intensity profile of light source 10 can be changed by changing the aspect ratio (ratio of average thickness x to width z) of channels 37, by varying the position and number of channels 37, and by varying the sizes of the channels 37 relative to each other.

Figure 3:
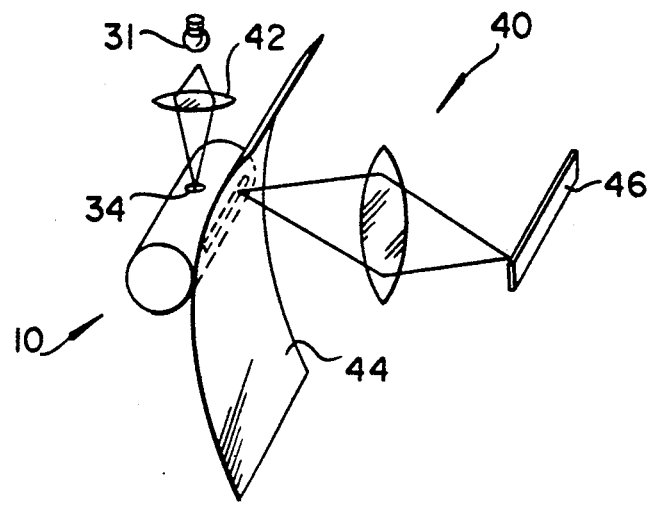
FIG. 3 is a perspective view showing the linear light source of the present invention incorporated into an input scanner.

Linear light source 10 can be used in an input scanner such as scanner 40 shown in FIG. 3. Scanner 40 comprises a light source 31 which produces a beam that is imaged into light source 10 by a lens 42. Light exiting slot 30 forms a line of diffuse light on film 44. Light transmitted through film 44 is imaged onto a photodetector 46 which can be, for example, a charge coupled device (CCD). The film 44 and the light source 10 are moved relative to each other in the cross-scan direction to scan the length of the film 44. Linear light source 10 can be used in a rotary scanner having a dynamic film gate, as disclosed, for example in U.S. patent application Ser. No. 559,481, entitled "Film Scanner," filed in the name of Fetterman et al. on Jul. 27, 1990.

Figure 5:
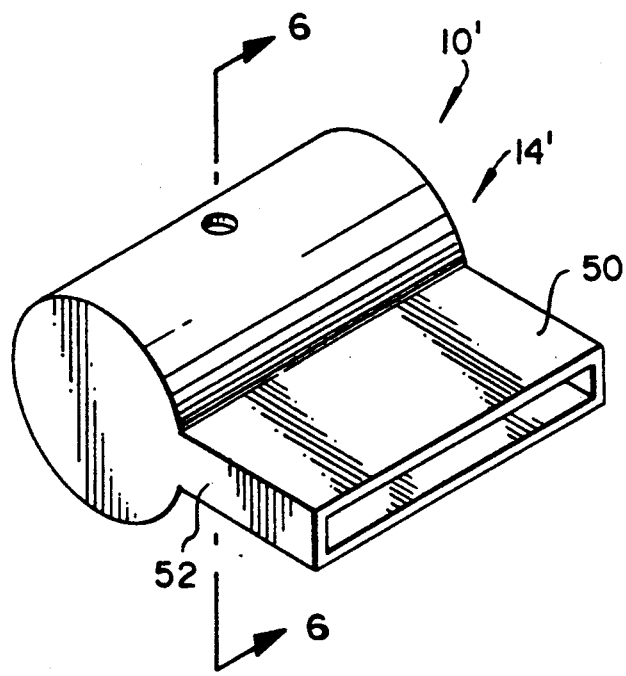
FIG. 5 is a perspective view of a second embodiment of the present invention.
Figure 6:
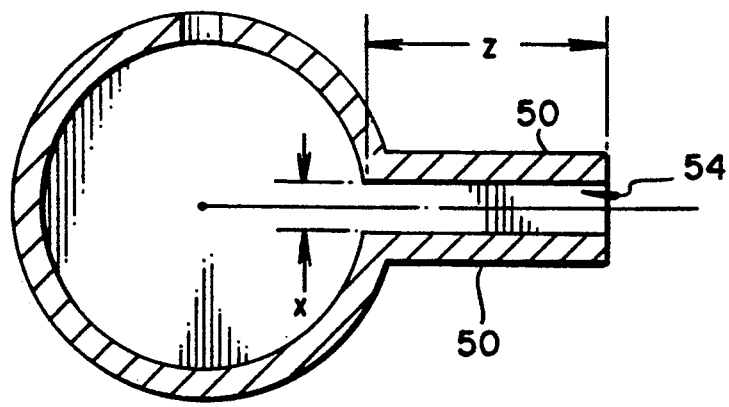
FIG. 6 is a sectional view taken along the line 6—6 in FIG. 5.

With reference to FIGS. 5 and 6, there is shown a second embodiment of the present invention. A linear light source 10' comprises a body 14' which is constructed generally the same as body 14, except that external plates 50 are mounted on body 14'. End pieces 52 are joined to plates 50 to form a channel 54 through which a beam travels from exit slot 30' of light source 10'. The angular intensity profile of light exiting from light source 10' is generally similar to curve a in FIG. 4. The angular intensity profile of light source 10' can be controlled by varying the ratio of the thickness x of channel 54 to the width z of the channel.

The invention has been described in detail with particular reference to the preferred embodiment thereof, but it will be understood that variations and modifications can be effected within the spirit and scope of the invention. For example, although the invention has been described as using a generally cylindrical integrating cavity, it will be apparent to those skilled in the art that other shapes of cavities could be used.

I claim:

1. A linear light source comprising:
a source for producing a beam of radiation; and
an elongated light integrating cavity defined by walls having diffusely-reflecting interior surfaces, said walls having a thickness extending from said interior surface to an exterior surface, said walls having an input port through which said beam is introduced into said cavity and an output slot generally parallel to a longitudinal axis of said cavity and extending through the entire thickness of said walls, the beam being introduced into said cavity such that the beam undergoes at least one diffuse reflection before exiting the output slot, and means extending laterally from said output slot for forming a channel adjacent the slot through which said beam exits.

2. A linear light source, as defined in claim 1, wherein said channel is formed by axially extending plates mounted adjacent said output slot.

3. A linear light source, as defined in claim 2, wherein said channels are formed in said cavity.

4. A linear light source, as defined in claim 3, wherein said channel is formed outside of said cavity.

5. A linear light source, as defined in claim 1, wherein a plurality of channels are formed adjacent said exit slot.

6. A linear light source, as defined in claim 5, wherein said channels are formed by at least three axially extending plates mounted in said cavity adjacent said output slot.

7. A linear light source, as defined in claim 6, wherein each of said plates forms an angle with an optical axis which is generally perpendicular to said longitudinal axis.

8. A linear light source, as defined in claim 1, wherein said cavity is generally cylindrical.

9. A linear light source, as defined in claim 1, wherein said channel has an aspect ratio greater than 1:3.

10. A linear light source comprising:
a source for producing a beam of radiation; and
an elongated light integrating cavity defined by walls having a diffusely-reflecting interior surfaces, said walls having an input port through which said beam is introduced into said cavity and an output slot through which said beam exits, said output slot being generally parallel to a longitudinal axis of said cavity, and a plurality of axially-extending plates disposed adjacent said slot which form at least one channel through which said beam exits said cavity.

11. A linear light source, as defined in claim 10, wherein said plates are in said cavity.

12. A linear light source, as defined in claim 10, wherein said plates are located outside said cavity.

13. A linear light source, as defined in claim 11, wherein said plates extend the length of said cavity.

14. A linear light source comprising:
a source for producing a beam of radiation;
an elongated light integrating cavity defined by walls having diffusely-reflecting interior surfaces, said walls having a thickness extending from said interior surface to an exterior surface said walls having an input port through which said beam is introduced into said cavity and an output slot generally parallel to a longitudinal axis of said cavity and extending through the entire thickness of said walls, the beam being introduced into said cavity such that the beam undergoes at least one diffuse reflection before exiting the output slot; and
means extending laterally from said output slot for controlling the angular intensity profile of the beam exiting the output slot.

* * * * *